(12) United States Patent
Birks et al.

(10) Patent No.: US 11,519,135 B2
(45) Date of Patent: Dec. 6, 2022

(54) RAILWAY RAIL INDUCTION-WELDING DEVICE

(71) Applicant: Mirage Ltd, Stoke on Trent (GB)

(72) Inventors: Kevin Birks, Trentham (GB); Mark Ross Finnemore, Newcastle (GB); Nicholas John Mountford, Stockton (GB)

(73) Assignee: Mirage Ltd, Stoke on Trent (GB)

( * ) Notice: Subject to any disclaimer, the term of this patent is extended or adjusted under 35 U.S.C. 154(b) by 1016 days.

(21) Appl. No.: 16/310,657

(22) PCT Filed: May 19, 2017

(86) PCT No.: PCT/GB2017/051399
§ 371 (c)(1),
(2) Date: Dec. 17, 2018

(87) PCT Pub. No.: WO2017/216515
PCT Pub. Date: Dec. 21, 2017

(65) Prior Publication Data
US 2019/0330805 A1 Oct. 31, 2019

(30) Foreign Application Priority Data
Jun. 17, 2016 (GB) ..................................... 1610650

(51) Int. Cl.
*E01B 29/46* (2006.01)
*B23K 13/01* (2006.01)
(Continued)

(52) U.S. Cl.
CPC ............ *E01B 29/46* (2013.01); *B23K 13/015* (2013.01); *B23K 37/0443* (2013.01);
(Continued)

(58) Field of Classification Search
CPC ........ E01B 29/04; E01B 29/044; E01B 29/46; B23K 13/015; B23K 37/0443; B23K 2101/26
See application file for complete search history.

(56) References Cited

U.S. PATENT DOCUMENTS 3,349,216 A 10/1967 Paton et al.
3,726,232 A 4/1973 Bryan, Jr.
(Continued)

FOREIGN PATENT DOCUMENTS

CA 1261363 A 9/1989
CN 102773614 A 8/2012
(Continued)

OTHER PUBLICATIONS

Combined Search and Examination Report for Appl. No. GB2011673.7, dated Aug. 28, 2020, 6 pp.
(Continued)

*Primary Examiner* — Robert J McCarry, Jr.
(74) *Attorney, Agent, or Firm* — James A. Sheridan; Sheridan Law, LLC (57) ABSTRACT

A railway rail induction-welding device is provided which includes a device support and a railway rail alignment means for aligning opposing railway rails in three mutually perpendicular directions, the railway rail alignment means being supported by the device support. The railway rail alignment means includes first and second railway-rail clamping elements to horizontally and longitudinally align the opposing railway rails when gripped by the first and second railway-rail clamping elements, with at least one of the first and second railway-rail clamping elements being movably supported by the device support, and a vertical lifting means for moving each railway-rail clamping element vertically to align the opposing railway rails. A railway rail clamping and lifting module, a vehicle a railway rail induc-
(Continued)

tion-welding device, and a method of inductively welding opposing railway rails together are also provided.

19 Claims, 6 Drawing Sheets

(51) Int. Cl.
*B23K 37/04* (2006.01)
*E01B 29/04* (2006.01)
*E01B 29/44* (2006.01)
*B23K 101/26* (2006.01)

(52) U.S. Cl.
CPC .............. *E01B 29/04* (2013.01); *E01B 29/44* (2013.01); *B23K 2101/26* (2018.08)

(56) References Cited

U.S. PATENT DOCUMENTS

| 5,992,329 | A | 11/1999 | Scheuchzer et al. | |
| 6,515,249 | B1 | 2/2003 | Valley et al. | |
| 2002/0170884 | A1 | 11/2002 | Thelen | |
| 2005/0067381 | A1 | 3/2005 | Coomer | |

FOREIGN PATENT DOCUMENTS

| CN | 103521935 | A | | 9/2013 | |
| CN | 103 495 800 | B | | 6/2015 | |
| CN | 103495800 | B | * | 6/2015 | ........... B23K 13/015 |
| EP | 0 253 634 | A2 | | 1/1988 | |
| EP | 0803313 | A2 | | 10/1997 | |
| EP | 1690624 | A1 | | 8/2006 | |
| FR | 2 479 724 | | | 4/1980 | |
| FR | 247924 | A1 | | 10/1981 | |
| FR | 2479724 | A1 | | 10/1981 | |
| GB | 1479531 | A | | 7/1977 | |
| GB | 2412622 | A | | 5/2005 | |
| GB | 2412622 | A | | 10/2005 | |
| GB | 2 530 264 | A | | 3/2016 | |
| JP | H08224673 | A | | 2/1995 | |
| WO | 1994/029073 | A1 | | 12/1994 | |
| WO | 2008/110778 | A1 | | 9/2008 | |
| WO | 2013/0495925 | A1 | | 4/2013 | |

OTHER PUBLICATIONS

Examination Report for Appl. No. 17 732 536.2, dated Oct. 26, 2020, 3 pp.
Examination Report for Appl. No. GB2011673.7 dated Dec. 8, 2020, 3 pp.
Patents Act 1977 Examination Report under Section 18(3) dated Sep. 27, 2019 for Appl. No. GB1610650.2, 5 pp.
Communication pursuant to Article 94(3) EPC, dated Nov. 26, 2019 for Appl. No. 17 732 536.2-1002, 3 pp.
Patents Act 1977 Examination Report under Section 18(3) dated Jan. 21, 2020 for Appl. No. GB1610650.2, 4 pp.
Intellectual Property Office of Singapore Search Report dated Feb. 28, 2020 for Appl. No. 11201900386T, 3 pp.
Intellectual Property Office of Singapore Written Opinion dated Mar. 2, 2020 for Appl. No. 11201900386T, 6 pp.
Written Opinion issued for Appl. No. SG11201900386T, dated Jan. 29, 2021, 4 pp.
International Search Report for Int. Appl. No. PCT/GB2017/051399, dated Aug. 10, 2017, 5 pp.
International Preliminary Report on Patentability for Int. Appl. No. PCT/GB2017/051399, dated Dec. 18, 2018, 7 pp.
English Abstract of CN103495800, 1 pp.
GB Search Report for Appl. No. GB1610650.2, dated Mar. 14, 2017, 2 pp.
English translation of CN103521935A, 29 pp.
English translation of CN102773614, 22 pp.
English translation of FR2479724, 4 pp.
GB Search Report for Appl. No. GB1610650.2, dated Jan. 27, 2017, 2 pp.
GB Search Report for Appl. No. GB1610650.2, dated Mar. 14, 2017, 1 pp.
English Abstract of JP H08224673A, 1 pp.

* cited by examiner

RAILWAY RAIL INDUCTION-WELDING DEVICE

The present invention relates to a railway rail induction-welding device for induction welding railway rails together. The invention further relates to a railway rail clamping and lifting module for such a device, and also to a vehicle having the device. Furthermore, there is provided a method of inductively welding opposing railway rails together.

To provide a smooth rail journey for a train or similar railway vehicle, the ideal scenario would be to provide a continuous length of rail stretching from start to finish. Imperfections between neighbouring rails can lead to a bumpy or clattering ride.

In practice, railway lines must be constructed from a plurality of sequential railway rails which are connected together. Historically, such rails have been engaged by the use of fishplates which physically connect to each of the adjacent rails; however, this results in a small gap between the rails. The gap between the rails means that the smoothness of the ride of the train across a join will be disrupted. Furthermore, a continuously welded rail, having no gaps between neighbouring rails, allows for a higher velocity of travel across the railway network, since there is a reduced risk of derailment as the speed is increased.

As an alternative, it is possible to weld consecutive and/or adjacent railway rails together, which results in a continuous railway formed from individual rails. Present methods, however, have health, safety and environmental issues, as well as the welds being low-quality and prone to shearing or stress fractures. For instance, thermic welds, using the Goldschmidt reduction process, involve the use of thermite and gas flame pre-heating, which results in a weld which is weaker than that of the parent rail, and the use of flame, pyrotechnic and waste molten metal significantly increases the danger to the user and fire hazard in the working area.

On the other hand, flash-butt welding requires high power hydraulic stressing repeatedly of the rail, utilising the end faces of the rails as electrodes in order to create the weld. However, flash-butt welding results in poor rail alignment, and suffers if electrical contact is poor. Similarly to thermic welding, there is a significant risk of setting fire to surrounding areas.

The present invention seeks to provide a way of providing a continuous smooth rail which does not result in a weakening of the joint between adjacent rails.

According to a first aspect of the invention, there is provided a railway rail induction-welding device comprising: a device support; a railway rail alignment means for aligning opposing railway rails in three mutually perpendicular directions, the railway rail alignment means being supported by the device support and including: first and second railway-rail clamping elements to horizontally and longitudinally align the opposing railway rails when gripped by the first and second railway-rail clamping elements, at least one of the first and second railway-rail clamping elements being movably supported by the device support; and vertical lifting means for moving each railway-rail clamping element vertically to align the opposing railway rails; urging means for moving at least one railway-rail clamping element towards the other clamping element to bring aligned opposing railway rails towards each other; and an induction heating device on the device support and interposed or interposable between the first and second railway-rail clamping elements to inductively weld the opposing railway rails together.

The provision of a device which can align railway rails in three mutually perpendicular directions during an induction welding process ensures that a strong, smooth and stable weld is formed, without resulting in significant stresses in the railway rails during the process. Providing a strong clamping force allows for aligned longitudinal urging of the railway rails towards one another to be effected, whilst the lifting means also permits vertical alignment of the rails during the process.

Preferably, the vertical lifting means may comprise first and second lifting elements supported by the device support, at least one of the first and second lifting elements being movably supported by the device support, and the first and second lifting elements may each comprise at least one lifting head. In this case, the at least one lifting head may include a pair of opposed pivotable lifting armatures, and a pivot point of each pivotable lifting armature may be proximate a lifting grip end of the pivotable lifting armature. The or each lifting head may be optionally associated with a linear actuator to effect a pivoting motion of the or each lifting head. The first and second lifting elements may be respectively co-located with the first and second railway-rail clamping elements to form first and second clamping and lifting modules. Optionally the vertical lifting means is adapted to engage with a head of the said railway rails.

The construction of the lifting means ensures that the railway rails are aligned during the induction welding process in a vertical direction, which would not otherwise be achievable were the induction welding to take place directly on the ground.

In one preferred embodiment, the first and second clamping elements may each comprise at least one clamping head, in which case the at least one clamping head may include a pair of opposed pivotable clamping armatures. Preferably, a pivot point of each pivotable clamping armature may be proximate a clamping grip end of the pivotable clamping armature, and the or each clamping head may be associated with a linear actuator to effect a pivoting motion of the or each clamping head. A plurality of said clamping heads may be provided for each of the first and second clamping elements and/or a plurality of said lifting heads may be provided for each of the first and second lifting elements, the or each clamping head being provided in an alternating configuration with the or each lifting head of the first and second lifting elements respectively. The first and second clamping elements may optionally be adapted to engage with a web of the said opposing railway rails.

The clamping elements are able to strongly engage with the railway rails to be welded, advantageously at multiple points of contact along the longitudinal extent of the rails. In doing so, a longitudinal alignment can be guaranteed, as can the horizontal alignment, provided that the first and second clamping elements are themselves correctly horizontally aligned.

The urging means may comprise at least one actuatable forge cylinder arrange to actuate the first or second clamping element towards the other, and the device may further comprise an actuatable shear die which is adapted to remove upset material following inductive welding of the opposing railway rails. Furthermore, there may be provided a device housing, and a support actuator, the support actuator being in engagement with the device housing and support to permit pivoting of the device support for maintenance.

The railway rail induction-welding device is beneficially arranged to be readily transportable to and from any given site, and then being able to readily forge adjacent rails together once there in a smooth motion. Preferably, the device is provided with a means of cleaning upset material or slag from the weld area, thereby advantageously leaving a smooth transition between the rails.

According to a second aspect of the invention, there is provided a railway rail clamping and lifting module for a railway rail induction-welding device, preferably in accordance with the second aspect of the invention, the railway rail clamping and lifting module comprising: a module frame; at least one clamping head supported by the module frame; and at least one lifting head supported by the module frame; the railway rail clamping and lifting module being arranged to engage with and simultaneously clamp and lift a railway rail inserted into the frame via the at least one clamping head and the at least one lifting head.

A module for a railway rail induction-welding device can be produced as a unit, allowing it to be installed directly into the device, and making manufacture, maintenance and repair of the device more straightforward. The provision of a combined clamping and lifting unit also serves to enforce the alignment of each railway rail from a single module, reducing the likelihood of miscalibration or misalignment of the device.

Preferably, the at least one clamping head may include a pair of opposed pivotable clamping armatures. A pivot point of each pivotable clamping armature may be proximate to a clamping grip end of the pivotable clamping armature, and the at least one lifting head may include a pair of opposed pivotable lifting armatures, in which case a pivot point of each pivotable lifting armature may be proximate a lifting grip end of the pivotable lifting armature. Optionally, the at least one clamping head and the at least one lifting head may be provided in an alternating configuration.

The construction of the clamping and lifting heads is such that the clearance required for actuation is minimal, typically, a change in width of the clamping and lifting heads upon activation is preferably less than 200 mm. This allows the railway rail induction-welding device to be utilised in constricted areas of track, such as in the vicinity of railway rail interchange or switching junctions.

According to a third aspect of the invention, there is provided a vehicle comprising a railway rail induction-welding device preferably in accordance with the first aspect of the invention. Preferably, the vehicle may be a road-rail vehicle.

A vehicle having both rail and road transitory capability can beneficially utilise the existing rail network in order to perform repairs to existing rails, whilst also being completely suited to the assembly of new stretches of railway track where none has previously been lain.

According to a fourth aspect of the invention, there is provided a method of inductively welding opposing railway rails together, the method comprising the steps of a] moving two facing ends of opposing railway rails into alignment in three mutually perpendicular directions; b] applying electromagnetic induction to the two facing ends to reach a welding temperature; and c] longitudinally forcing the two facing ends of the aligned railway rails towards one another to inductively weld the railway rails together.

The alignment of railway rails during a welding process is critical for the minimising of stresses or strains on the metal of the rails following welding. The described method therefore allows such forces to be minimised as a result of the weld due to the accurate alignment of the railway rails.

Preferably, during step c], the two facing ends may be forced into contact with one another to form a direct weld between the railway rails. Alternatively, before step b], a sacrificial piece of railway rail is positioned between the opposing railway rails, and during step c], the two facing ends of the railway rails are forced into contact with the sacrificial piece of railway rail to form an indirect weld between the railway rails.

The present invention can advantageously be used not only to join adjacent railway rails directly, but also by using a piece of sacrificial track which is completely melted during the welding process. This improves the flexibility of the induction welding process in a variety of contexts.

According to a fifth aspect of the invention, there may be provided an induction-welding device comprising: a device support; first and second clamping elements to align opposing objects when gripped by the first and second clamping elements, at least one of the first and second clamping elements being movably supported by the device support; and vertical lifting means for moving each clamping element vertically to align the opposing objects; urging means for moving at least one clamping element towards the other clamping element to bring aligned opposing objects towards each other; and an induction heating device on the device support and interposed or interposable between the first and second clamping elements to inductively weld the opposing objects together.

According to a sixth aspect of the invention, there is provided a railway rail induction-welding device comprising: a device support; a railway rail alignment means for aligning opposing railway rails, the railway rail alignment means being supported by the device support and including at least a clamping means for holding the opposing railway rails in alignment; urging means for moving the aligned opposing railway rails towards each other within the clamping means; and an induction heating device on the device support to inductively weld the opposing railway rails together.

The invention will now be more particularly described, by way of example only, with reference to the accompanying drawings, in which.

Referring firstly to FIGS. 1 to 4, there is illustrated a railway rail induction-welding device, indicated globally at 10, and which is used to weld two adjacent railway rails together. It will be appreciated that the mechanism of welding the adjacent rails together utilises electromagnetic induction to heat the ends of the adjacent rails before longitudinally forcing the rails together, and in the present context is therefore referred to as induction welding. However, this process is also known as forging in some contexts, and it will be appreciated that this is the same process.

The railway rail induction-welding device 10 is a device for ensuring that a correct alignment of the adjacent railway rails is maintained during the induction welding process, and this is achieved by the specific clamping and lifting arrangement of the railway rail induction-welding device 10.

The railway rail induction-welding device 10 comprises a device support 12, which is here formed as a rigid frame or cage for the component parts of the device 10, upon which is mounted an alignment means for aligning adjacent railway rails, preferably in three mutually perpendicular directions, such as those corresponding to the Cartesian axes.

In the present embodiment, the alignment means comprises first and second railway rail clamping and lifting modules 14a, 14b, each of which includes at least one clamping element 16 and a vertical lifting means, preferably also formed as at least one vertical lifting element 18. However, whilst the railway rail clamping and lifting modules 14a, 14b are provided having both clamping and lifting elements 16, 18 in the present invention, it will be appreciated that these could be provided separately to one another if so desired.

At least one of the railway rail clamping and lifting modules 14a is provided so as to be movably supported by the device support 12, which is here mounted to a slidable carriage 20 which can be urged towards or away from the second railway rail clamping and lifting module 14b by a, preferably pneumatic or hydraulic actuator, here formed as forging cylinder 22. The second railway rail clamping and lifting module 14b is stationary relative to the device support 12.

Interposed, or interposable, between the railway rail clamping and lifting modules 14a, 14b is an induction heating device 24 on the device support 12 to inductively weld the opposing railway rails together which have been respectively engaged by the railway rail clamping and lifting modules 14a, 14b. This may be formed as an enclosure which can be positioned about the adjacent ends of the railway rails, or, if used, a sacrificial piece of rail, in order to heat and weld or forge the railway rails into a single, continuous rail. The induction heating device 24 may be provided so as to be coupled to an induction controller 26, which is coupled to an induction coil of the induction heating device 24, for example, via a transformer to heat and melt the ends of the railway rails.

There may also be provided a shear die 28 which has a complementarily shaped profile to a railway rail to be welded, and which is able to be urged in a direction towards the weld of the two railway rails. This allows any upset material to be sheared away from the weld, thereby creating a smooth join between adjacent railway rails. The shear die 28 can be actuated into position preferably using a pneumatic or hydraulic cylinder 30.

Figure 1:
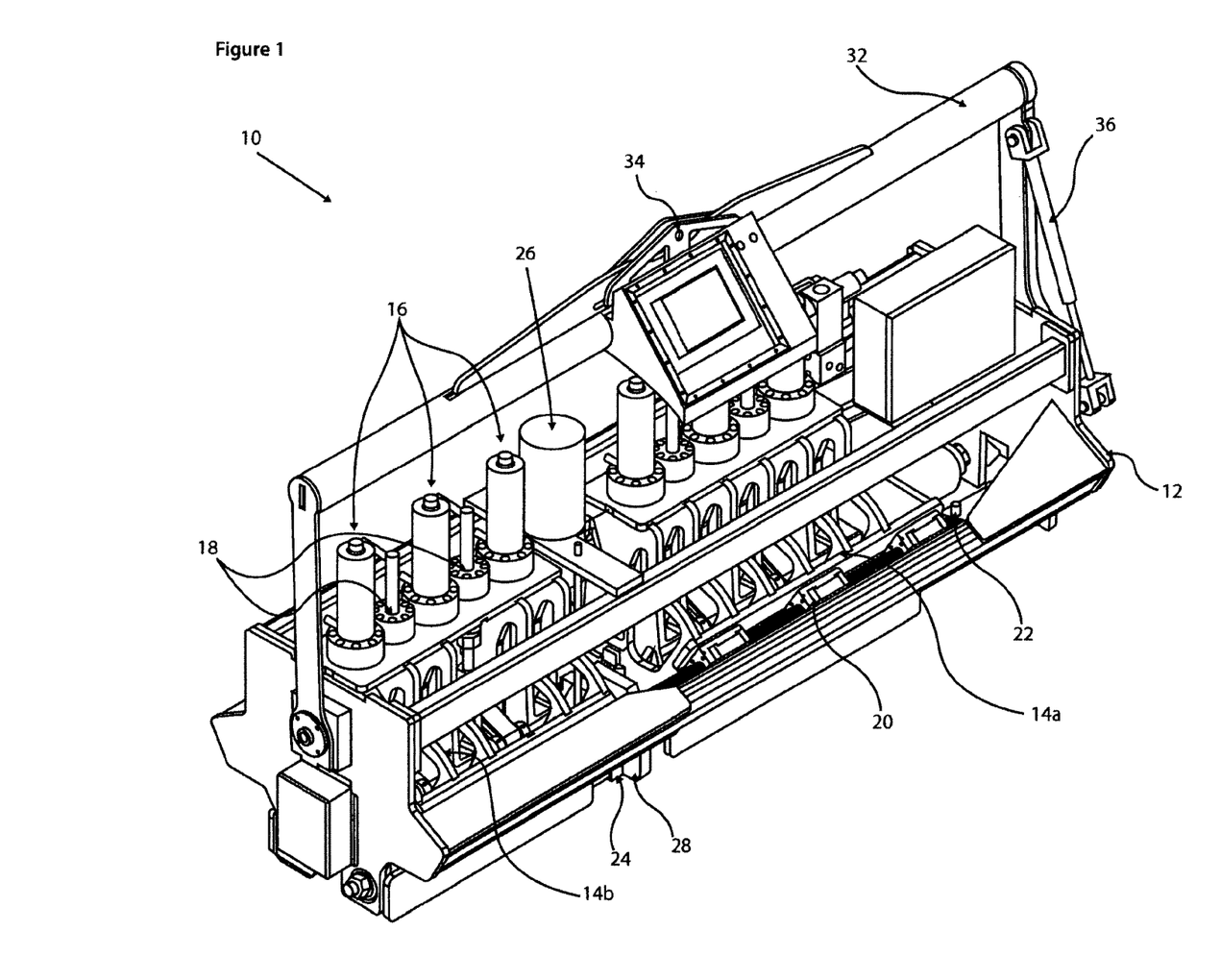
FIG. 1 is a perspective representation of one embodiment of a railway rail induction-welding device in accordance with the first aspect of the invention.
Figure 2:
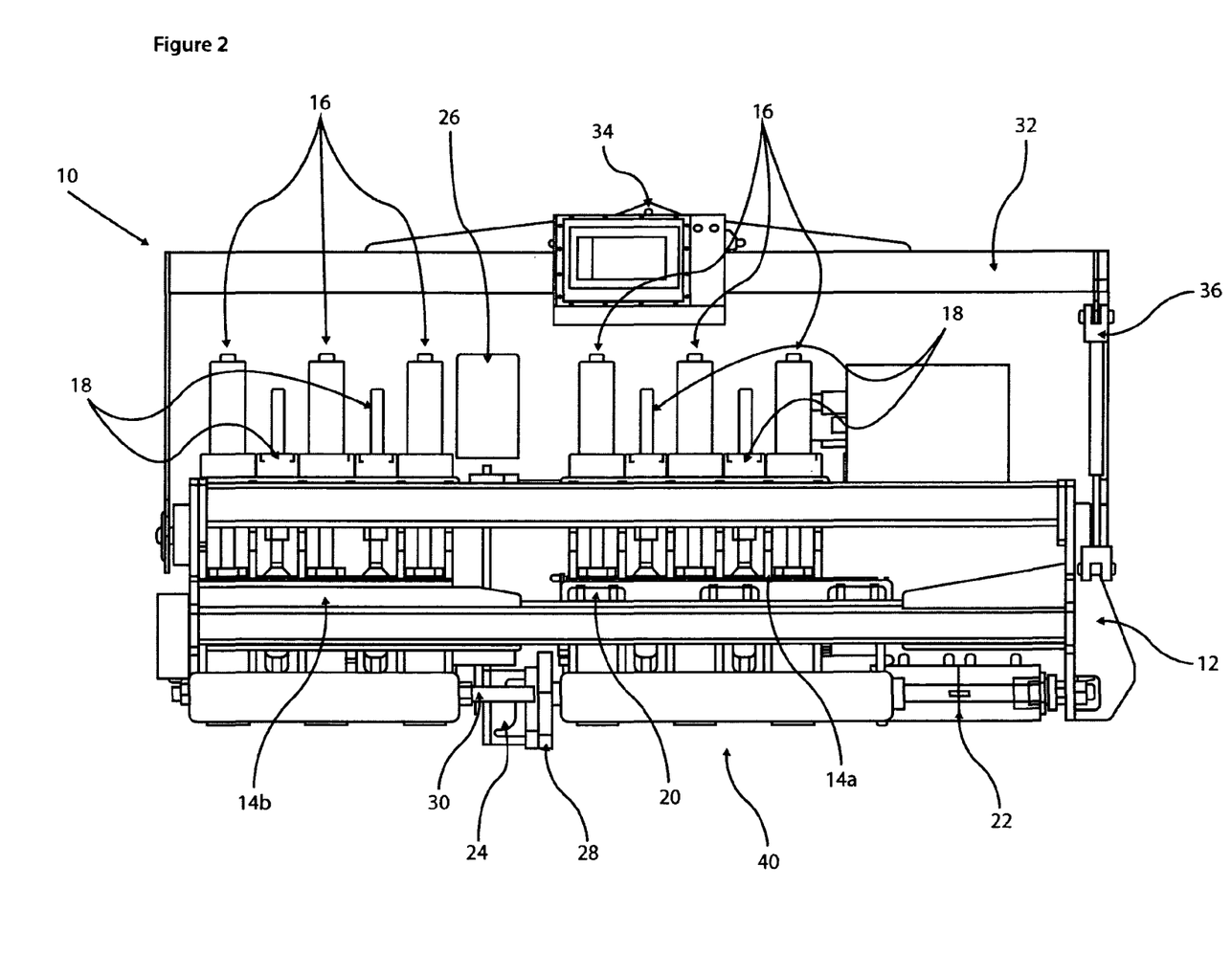
FIG. 2 is a side-on representation of the railway rail induction-welding device of FIG. 1.
Figure 3:
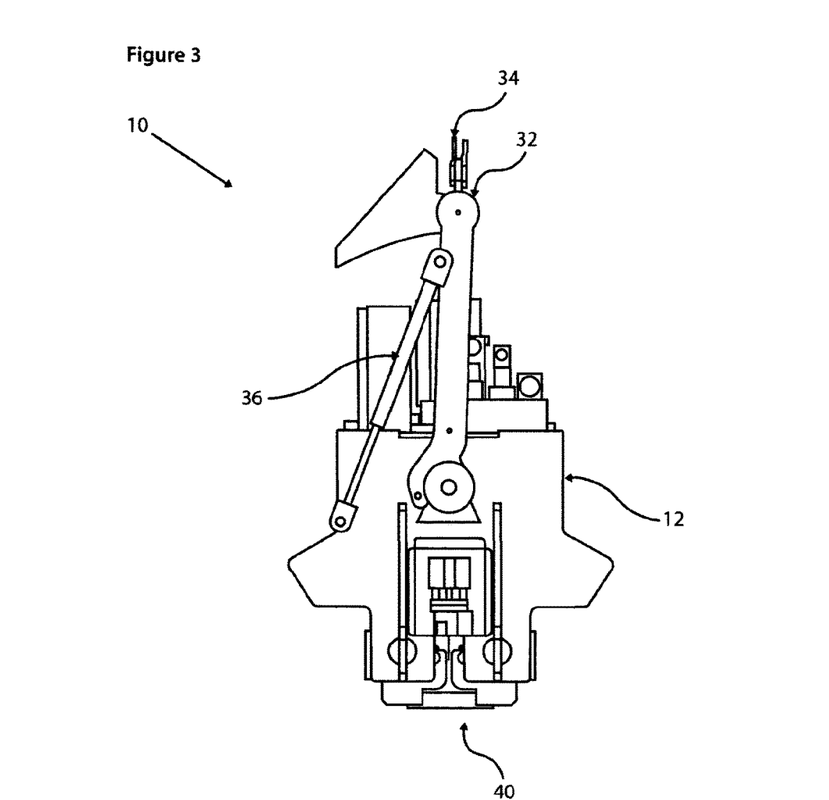
FIG. 3 is an end-on representation of the railway rail induction-welding device of FIG. 1.
Figure 4:
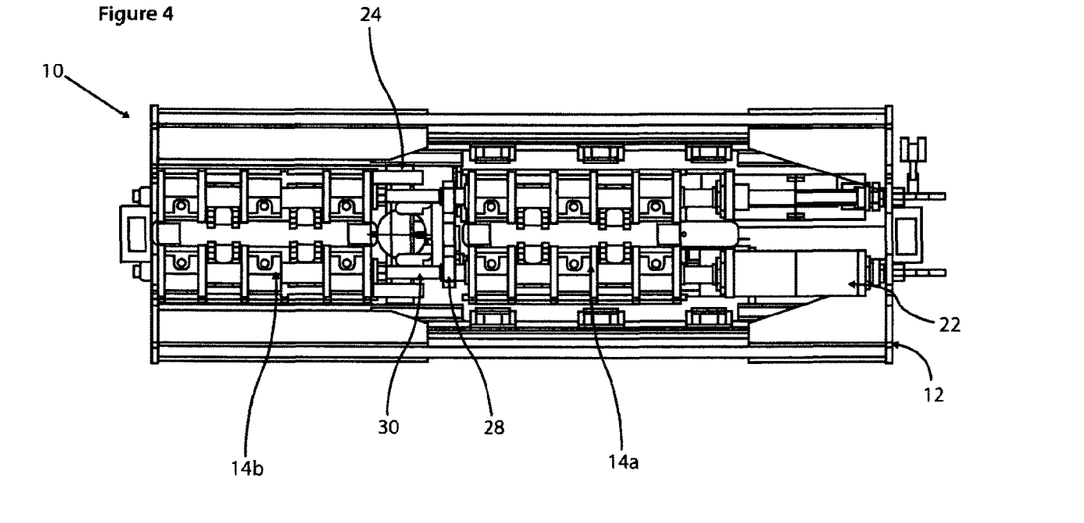
FIG. 4 is a plan view from below of the railway rail induction-welding device of FIG. 1.
Figure 5:
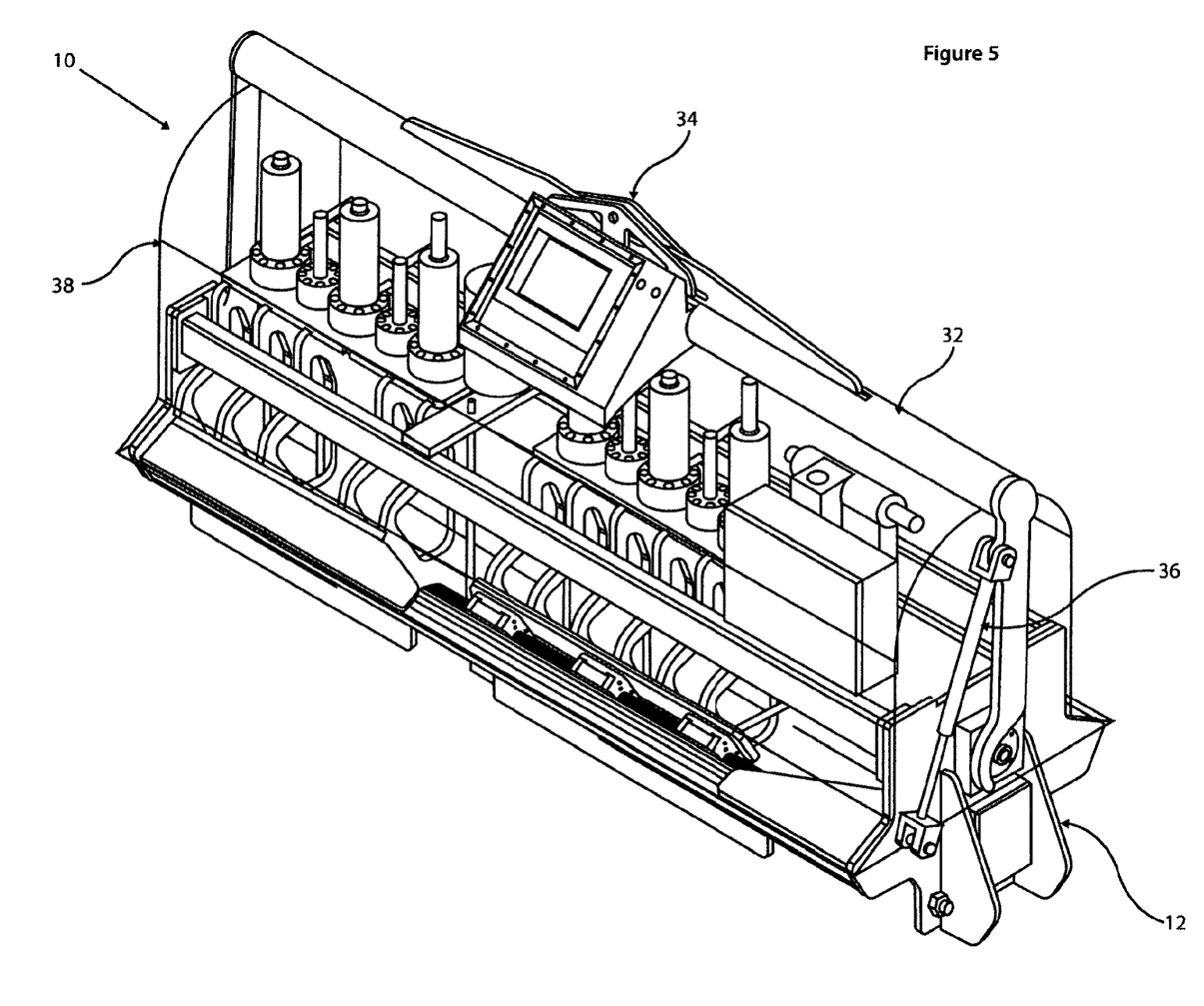
FIG. 5 is a perspective representation of the railway rail induction-welding device of FIG. 1, including a device housing.

The railway rail induction-welding device 10 may be provided having a coupling 32 which allows the support 12 to be connected to a vehicle. In the depicted embodiment, the coupling 32 is formed as a crossbar which is pivotable about the support 12, and having a connector 34 at an upper end of the coupling 32 allowing for connection of the railway rail induction-welding device 10 to a vehicle. There may be provided an actuator 36, such as a hydraulic ram or piston, which is connected at a first end to the support 12 and at a second end to the coupling 32. A device housing 38 may also be provided so as to protect the components of the railway rail induction-welding device in transit. Such a housing can be seen in FIG. 5.

When in use, the railway rail induction-welding device 10 presents a lower face 40 which can be positioned at or adjacent to the ground near the railway rails to be joined. This can be most readily seen in FIG. 4. The lower face 38 can be brought into contact with the ground either near to the railway rails, which can be inserted into the railway rail induction-welding device 10, or could be lowered over and around adjacent railway rails.

Figure 6:
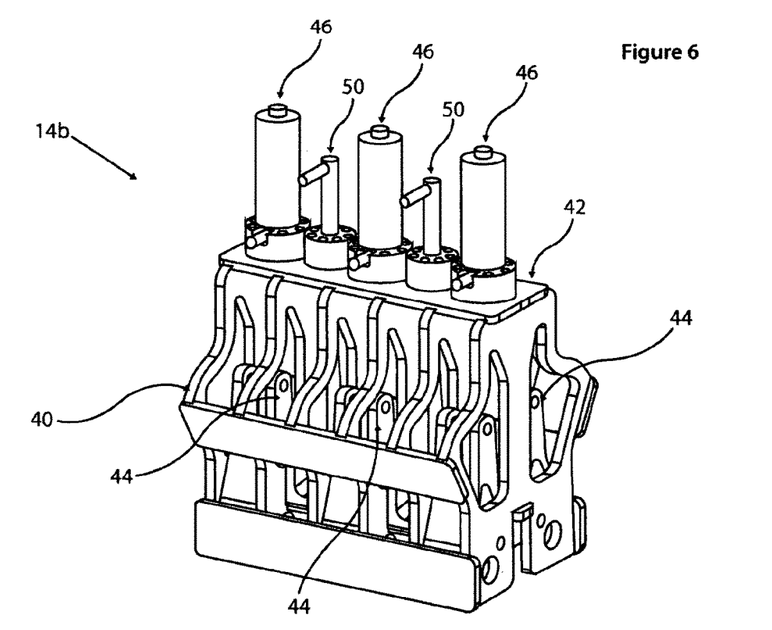
FIG. 6 is a perspective representation of one embodiment of a railway rail clamping and lifting module in accordance with the second aspect of the invention, for use as part of the railway rail induction-welding device of FIG. 1.
Figure 7:
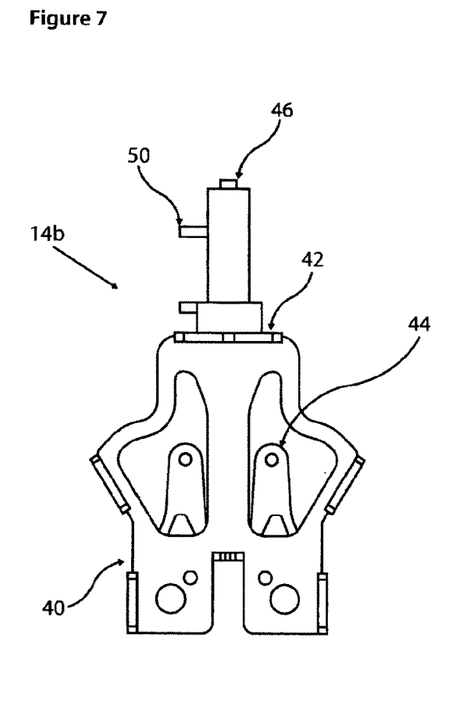
FIG. 7 is an end-on view of the railway rail clamping and lifting module of FIG. 6.
Figure 8:
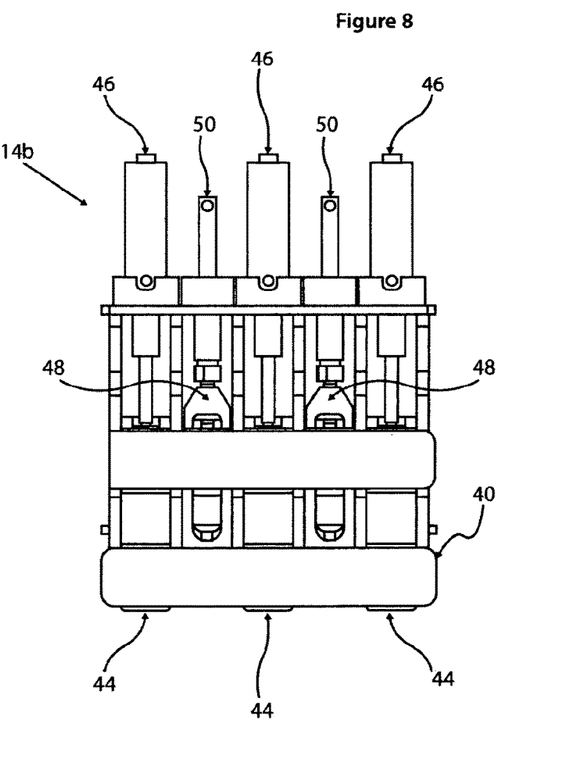
FIG. 8 is a side-on view of the railway rail clamping and lifting module of FIG. 6.

The engagement of the railway rail induction-welding device 10 with the railway rails can be most readily interpreted from FIGS. 6 to 8, which illustrate the second railway rail clamping and lifting module 14b in detail, though it will be appreciated that the first railway rail clamping and lifting module 14a will be identically or similarly constructed.

The railway rail clamping and lifting module 14b comprises a, preferably elongate, module frame 40 which here defines a series of longitudinal partitions therein. The module frame 40 provides structural support to the clamping element 16 and vertical lifting means of the railway rail clamping and lifting module 14b, and is therefore adapted to accommodate the form of each.

At an upper end 42 of the module frame 40 there may be provided a plurality of apertures which allow for one or more actuators to be provided with access to the interior of the module frame 40. In the depicted embodiment, there is provided a clamping element 16 having three discrete clamping heads 44, each of which having a clamping actuator 46 associated therewith, and a vertical lifting element 18 having two discrete lifting heads 48, each of which is associated with a lifting actuator 50. It will be apparent that the form of the clamping element 16 and/or vertical lifting element 18 could be altered in order to accommodate a particular type, weight or class of railway rail; in particular, it will be appreciated that any number of clamping heads 44 or lifting heads 48 may be provided, though a plurality of each is preferred, since this will improve the alignment of the railway rails once clamped.

Figure 9:
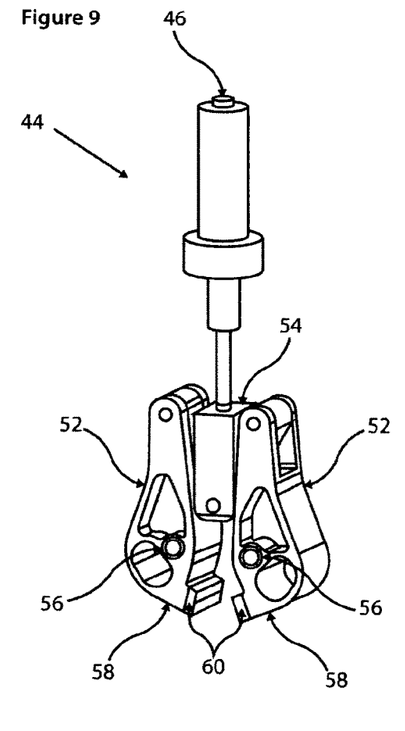
FIG. 9 is a perspective representation of one embodiment of a clamping head as utilised in the railway rail clamping and lifting module of FIG. 6.
Figure 10:
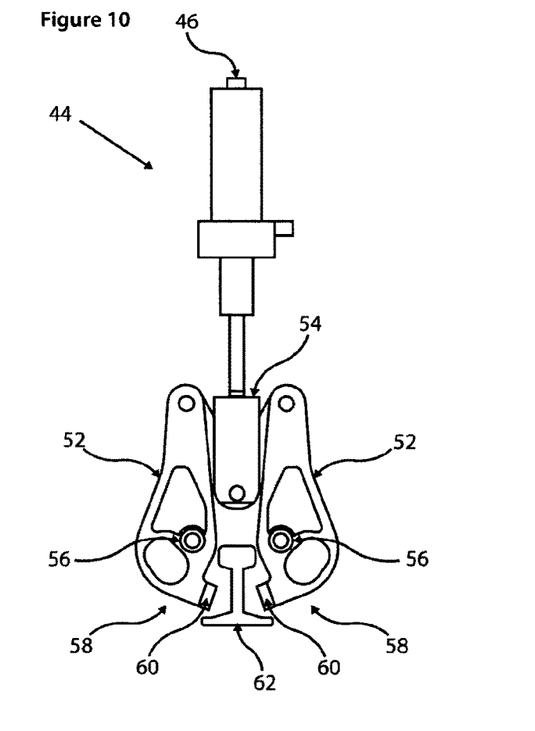
FIG. 10 is an end-on view of the clamping head of FIG. 9, indicating a position of a railway rail to be clamped.

An indicative clamping head 44 of a clamping element 16 is shown in FIGS. 9 and 10. The clamping head 44 preferably comprises two opposed pivotable clamping armatures 52, each of which is connected, preferably at a central position, to a movable clamping linkage 54, here being a dual-armed linkage, which is coupled to its respective clamping actuator 46. The clamping actuator 46 may be formed as a linear actuator, although other types of actuator are possible, such as a rotary actuator, and imparts force to the clamping linkage 54. The clamping linkage 54 may preferably be connected to each pivotable clamping armature 52 at an end which is proximate the clamping actuator 46.

Each pivotable clamping armature 52 may be provided so as to be pivotable about a fixed pivot 56 which is preferably in fixed contact with the module frame 40. The fixed pivots 56 are engaged with the pivotable clamping armatures 52 at an end which is proximate, near or adjacent to a clamping grip end 58 of the pivotable clamping armature 52, which is an end, though not necessarily the distalmost portion of the pivotable clamping armature 52, which includes a clamping grip 60.

The positioning of the fixed pivot 56 close to the clamping grip 60 for each pivotable clamping armature 52 allows for a clamping head 44 to be provided which has a strong gripping force without creating significant deviations in the width of the clamping head 44 as the clamping actuator 46 is activated.

The clamping head 44 is shown in position about a railway rail 62 in FIG. 10. As can be seen, the pivotable armatures 52 are in an open state, with the clamping grips 60 being non-parallel and sufficiently spaced apart so as to be receivable over a top of the railway rail 62. The clamping grips 60 are here arranged to provide a clamping force either side of the web of the railway rail 62.

As the clamping actuator 46 is activated, the pivotable clamping armatures 52 will pivot about their respective fixed pivots 56, bringing the clamping grips 60 into a parallel configuration about either side of the web of the railway rail 62, contacting and clamping the railway rail 62 in a horizontal direction. Furthermore, if a plurality of clamping heads 44 is provided in a spaced apart arrangement, then a plurality of clamping points along the longitudinal extent of the railway rail 62 will be provided, ensuring a longitudinal alignment of the railway rail 62 when clamped.

It will be appreciated that although a pivotable clamping arrangement is described above, a linear-type vice or clamp could be provided as an alternative which can clamp the web or another part of the railway rail 62, and such configurations will be apparent to the skilled person.

Figure 11:
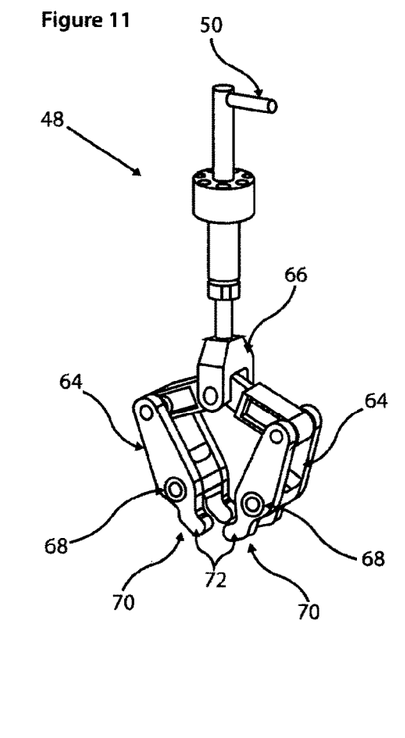
FIG. 11 is a perspective representation of one embodiment of a lifting head as utilised in the railway rail clamping and lifting module of FIG. 6.
Figure 12:
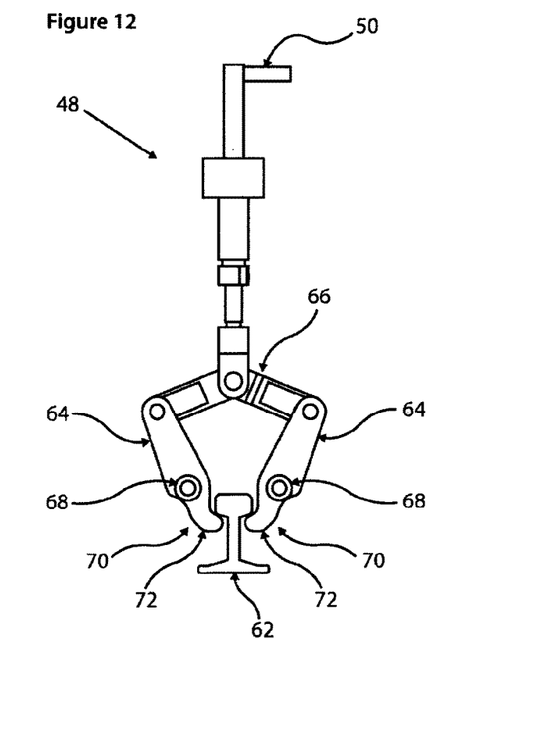
FIG. 12 is an end-on view of the lifting head of FIG. 11, indicating a position of a railway rail to be lifted.

An indicative lifting head 48 of a lifting element 18 is shown in FIGS. 11 and 12. The lifting head 48 preferably comprises two opposed pivotable lifting armatures 64, each of which is connected, preferably at a central position, to a movable lifting linkage 66 which is coupled to its respective lifting actuator 50. The lifting actuator 50 may be formed as a linear actuator, although other types of actuator are possible, such as a rotary actuator, and imparts force to the lifting linkage 66. The lifting linkage 66 may preferably be connected to each pivotable lifting armature 64 at an end which is proximate the lifting actuator 50.

Each pivotable lifting armature 64 may be provided so as to be pivotable about a further fixed pivot 68 which is preferably in fixed contact with the module frame 40. The further fixed pivots 68 are engaged with the pivotable lifting armatures 64 at an end which is proximate, near or adjacent to a lifting grip end 70 of the pivotable lifting armature 64, which is an end, though not necessarily the distalmost portion of the pivotable lifting armature 64, which includes a lifting grip 72.

The positioning of the further fixed pivot 68 close to the lifting grip 72 for each pivotable lifting armature 64 allows for a lifting head 48 to be provided which has a strong gripping force without creating significant deviations in the width of the lifting head 48 as the lifting actuator 50 is activated.

The lifting head 48 is shown in position about a railway rail 62 in FIG. 10. As can be seen, the pivotable lifting armatures 64 are in a closed state, with the lifting grips 72 being in contact with an underside of the top of the railway rail 62. The lifting grips 72 are here arranged to provide a lifting force to the underside of the top of the railway rail 62, and therefore may provide a reduced force onto the railway rail 62 when compared with the clamping grips 60 of the clamping head 44.

As the lifting actuator 50 is activated, the pivotable lifting armatures 64 will pivot about their respective further fixed pivots 68, bringing the lifting grips 72 into a contact with the underside of the top of the railway rail 62, providing support to the top of the railway rail in a vertical direction. Again, if a plurality of lifting heads 48 is provided in a spaced apart arrangement, then a plurality of lifting points of contact along the longitudinal extent of the railway rail 62 will be provided, which will further ensure a longitudinal and vertical alignment of the railway rail 62 when lifted.

It will be appreciated that although a pivotable lifting arrangement is described above, a linear-type vice or platform could be provided as an alternative which can contact part of the railway rail 62, and such configurations will be apparent to the skilled person. By way of example, a vertical lifting means could be provided which applies a lifting force to the foot of the railway rail 62, raising the railway rail 62 from below, rather than hanging the railway rail 62.

A preferred configuration of the railway rail clamping and lifting module 14b is one in which a plurality of each of the clamping and lifting heads 44, 48 is provided in an alternating arrangement, providing a plurality of clamping and lifting points of contact along the longitudinal extent of the railway rail 62.

To utilise the railway rail induction-welding device 10, it may be transported to the site of the railway rails 62 to be welded or forged, for instance, as a vehicular attachment. A vehicle having the railway rail induction-welding device 10 may preferably be a road-rail vehicle which is able to travel on existing railway lines, and also which has wheels so as to be able to travel using the road network.

The railway rail induction-welding device 10 can be engaged with the ends of the railway rails 62 to be welded, with both the clamping elements 16 and vertical lifting elements 18 of the first and second clamping and lifting modules 14a, 14b being in open conditions so as to be receivable about the respective rails. The first and second clamping and lifting modules 14a, 14b will be spaced apart in a longitudinal direction of the railway rail induction-welding device 10, the forging cylinder 22 being in a retracted state or condition.

Once in situ, the clamping and lifting actuators 46, 50 of the respective first and second clamping and lifting modules 14a, 14b can be activated, either sequentially or simultaneously. The clamping heads 44 will clamp the railway rails 62 about their respective webs, providing not only longitudinal alignment of the railway rails 62, since the first and second clamping and lifting modules 14a, 14b are aligned to one another, but also horizontal alignment of the end faces of the railway rails 62. It will be appreciated that alignment of the end faces of the railway rails 62 may not necessarily be direct; there may be provided a sacrificial piece of railway rail which can be positioned between the end faces and which is consumed by the induction welding process.

Furthermore, the vertical lifting heads 46 are actuated such that the lifting grips 72 contact with the underside of the top of the respective railway rails 62, partially raising the respective ends of the railway rails 62 from the ground, whilst maintaining a vertical alignment of the end faces.

Once aligned, preferably in the three mutually perpendicular directions of the railway rails 62, that is, vertically, horizontally and longitudinally, electromagnetic induction can be applied to the two facing ends of the railway rails 62 by the induction heating device 24 until a welding temperature is reached. This allows the railway rails 62 to be welded or forged together. In order to provide clean end faces of the railway rails 62 prior to welding, the end faces or regions to be welded may be purged with, for instance, an inert gas, which can reduce the oxidation of the end faces prior to welding. This may serve to increase the eventual strength of the weld.

Where three mutually perpendicular directions are referred to, these could be considered as being the respective longitudinal axes of the railway rails 62 to be joined, and then the vertical and horizontal directions in the plane of the respective end faces of the railway rails 62.

Once the railway rails 62 are both clamped and lifted sufficiently heated, then the first and second clamping and lifting modules 14a, 14b can be longitudinally urged towards one another. In the depicted embodiment, this is achieved by actuating the first clamping and lifting module 14a towards the second clamping and lifting module 14b using the forging cylinder 22.

As the molten facing ends come into contact with one another, or come into contact with the sacrificial piece of railway rail, then a continuous railway rail will be formed. In order to maintain an alignment of the railway rails 62, the clamping and lifting heads 44, 48 may be locked in positioned, preventing escape of the railway rails 62 from the clamped and lifted aligned condition. In the process, some upset material or slag will be emitted at or adjacent to the weld, and this can be cleared from the weld by drawing the shear die 28 across the upset material, thereby forcing it away from the railway rail 62. This results in a smooth and shapely weld.

Once the weld has been formed, it can be allowed to cool, and then the welded rail can be released by the railway rail induction-welding device 10, allowing the railway rail to be released onto the ground. This cooling may be enhanced by, for example, use of a blast cooler. Other means of cooling are available, however, which can assist with the hardening and/or quenching of the continuous rail following induction welding, such as by using water or similar liquid spray.

It will be appreciated that the railway rail induction-welding device 10 may be provided with a controller which is able to control and/or log any relevant information relating to the induction welding process, which will allow the user to react to any significant information which is fed back. Such a controller may also assist with automatic alignment of the end faces of the railway rails 62 prior to induction welding, should there be imperfections between the shapes or sizes of the end faces.

Whilst discrete clamping and lifting actuators have been described above, it will be appreciated that these could be provided as a single actuation unit associated with each of the clamping and lifting modules. Similarly, where the clamping and lifting modules are described as being a single unit, separate clamping and lifting elements could feasibly be provided.

Additionally, whilst a lifting means will assist with the vertical alignment of the railway rails once introduced into the railway-rail induction welding device, it will be appreciated that a correctly aligned clamping means could be provided in a pre-existing vertical alignment, such that the introduction of the railway rails into the device automatically aligns the rails by virtue of the orientation of the clamping means, without the need for specific lifting of the rails.

It is also noted that whilst the intended use of the present induction welding device is in the forging of railway rails, it will be clear to the skilled person that such a device could also be used in other contexts, for instance, in the forging of structural steelwork in the construction of buildings.

It is therefore possible to provide a device which assists with the clamping, lifting and aligning of adjacent railway rails for an induction welding or forging process, in particular, for maintaining an alignment of the railway rails in three mutually perpendicular directions during the induction welding process. This can be achieved by the provision of clamping and lifting elements which clamp and lift the railway rails in alignment without displacement as the weld is formed.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A railway rail induction-welding device comprising:
   a device support;
   a railway rail alignment means for aligning opposing railway rails in three mutually perpendicular directions, the railway rail alignment means being supported by the device support and including:
      first and second railway-rail clamping elements to horizontally and longitudinally align the opposing railway rails when gripped by the first and second railway-rail clamping elements, at least one of the first and second railway-rail clamping elements being movably supported by the device support; and
      vertical lifting means for moving each railway-rail clamping element vertically to align the opposing railway rails, the vertical lifting means comprising first and second lifting elements supported by the device support, at least one of the first and second lifting elements being movably supported by the device support and the first and second lifting elements each comprise at least one lifting head, the at least one lifting head being arranged to contact a railway rail;
   urging means for moving at least one railway-rail clamping element towards the other clamping element to bring aligned opposing railway rails towards each other; and
   an induction heating device on the device support and interposed or interposable between the first and second railway-rail clamping elements to inductively weld the opposing railway rails together.

2. A railway rail induction-welding device as claimed in claim 1, wherein the at least one lifting head includes a pair of opposed pivotable lifting armatures.

3. A railway rail induction-welding device as claimed in claim 2, wherein the or each lifting head is associated with a linear actuator to effect a pivoting motion of the or each lifting head.

4. A railway rail induction-welding device as claimed in claim 2, wherein a pivot point of each pivotable lifting armature is proximate a lifting grip end of the pivotable lifting armature.

5. A railway rail induction-welding device as claimed in claim 1, wherein the first and second lifting elements are respectively co-located with the first and second railway-rail clamping elements to form first and second clamping and lifting modules.

6. A railway rail induction-welding device as claimed in claim 1, wherein the vertical lifting means is adapted to engage with a head of the said railway rails.

7. A railway rail induction-welding device as claimed in claim 1, comprising at least one of the following: wherein the first and second clamping elements each comprise at least one clamping head ; and wherein the first and second clamping elements are adapted to engage with a web of the said opposing railway rails.

8. A railway rail induction-welding device as claimed in claim 7, wherein the at least one clamping head includes a pair of opposed pivotable clamping armatures, wherein a pivot point of each pivotable clamping armature is proximate a clamping grip end of the pivotable clamping armature.

9. A railway rail induction-welding device as claimed in claim 8, wherein the or each clamping head is associated with a linear actuator to effect a pivoting motion of the or each clamping head.

10. A railway rail induction-welding device as claimed in claim 7, wherein a plurality of said clamping heads is provided for each of the first and second clamping elements and/or a plurality of said lifting heads is provided for each of the first and second lifting elements, the or each clamping head being provided in an alternating configuration with the or each lifting head of the first and second lifting elements respectively.

11. A railway rail induction-welding device as claimed in claim 1, wherein the urging means comprises at least one actuatable forge cylinder arrange to actuate the first or second clamping element towards the other.

12. A railway rail induction-welding device as claimed in claim 1, further comprising at least one of the following: an actuatable shear die which is adapted to remove upset material following inductive welding of the opposing railway rails; and a device housing, and a support actuator, the support actuator being in engagement with the device housing and device support to permit pivoting of the device support for maintenance.

13. A railway rail clamping and lifting module for a railway rail induction-welding device as claimed in claim 1, the railway rail clamping and lifting module comprising:

a module frame;
at least one clamping head supported by the module frame; and
at least one lifting head supported by the module frame;
the railway rail clamping and lifting module being arranged to engage with and simultaneously clamp and lift a railway rail inserted into the frame via the at least one clamping head and the at least one lifting head.

14. A railway rail clamping and lifting module as claimed in claim 13, wherein the at least one clamping head includes a pair of opposed pivotable clamping armatures.

15. A railway rail clamping and lifting module as claimed in claim 14, wherein a pivot point of each pivotable clamping armature is proximate a clamping grip end of the pivotable clamping armature.

16. A railway rail clamping and lifting module as claimed in claim 15, wherein the at least one lifting head includes a pair of opposed pivotable lifting armatures, and a pivot point of each pivotable lifting armature is proximate a lifting grip end of the pivotable lifting armature.

17. A railway rail clamping and lifting module as claimed in claim 13, wherein the at least one clamping head and the at least one lifting head are provided in an alternating configuration.

18. A method of inductively welding opposing railway rails together, the method comprising the steps of:
a] moving two facing ends of opposing railway rails into alignment in three mutually perpendicular directions using a railway rail induction-welding device as claimed in claim 1;
b] applying electromagnetic induction to the two facing ends to reach a welding temperature; and
c] longitudinally forcing the two facing ends of the aligned railway rails towards one another to inductively weld the railway rails together.

19. A method as claimed in claim 18, comprising one of the following: wherein during step c], the two facing ends are forced into contact with one another to form a direct weld between the railway rails; or wherein before step b], a sacrificial piece of railway rail is positioned between the opposing railway rails, and during step c], the two facing ends of the railway rails are forced into contact with the sacrificial piece of railway rail to form an indirect weld between the railway rails.

* * * * *